US011973323B2

(12) United States Patent
Sugiura

(10) Patent No.: US 11,973,323 B2
(45) Date of Patent: Apr. 30, 2024

(54) SPARK PLUG FOR INTERNAL COMBUSTION ENGINE

(71) Applicant: DENSO CORPORATION, Kariya (JP)

(72) Inventor: Akimitsu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/074,722

(22) Filed: Dec. 5, 2022

(65) Prior Publication Data

US 2023/0094043 A1 Mar. 30, 2023

Related U.S. Application Data

(63) Continuation of application No. PCT/JP2021/016127, filed on Apr. 21, 2021.

(30) Foreign Application Priority Data

Jun. 9, 2020 (JP) ................................ 2020-100406

(51) Int. Cl.
*H01T 13/32* (2006.01)
*H01T 13/34* (2006.01)
*H01T 13/54* (2006.01)

(52) U.S. Cl.
CPC ............ *H01T 13/32* (2013.01); *H01T 13/34* (2013.01); *H01T 13/54* (2013.01)

(58) Field of Classification Search
CPC ................................ H01T 13/34; H01T 13/32
See application file for complete search history.

(56) References Cited

U.S. PATENT DOCUMENTS

| | | | |
|---|---|---|---|
| 2005/0211217 | A1 | 9/2005 | Boley et al. |
| 2006/0005803 | A1 | 1/2006 | Robinet et al. |
| 2011/0148274 | A1 | 6/2011 | Ernst et al. |

(Continued)

FOREIGN PATENT DOCUMENTS

| | | |
|---|---|---|
| DE | 101 44 976 | 4/2003 |
| DE | 10 2011 076 471 | 11/2012 |

(Continued)

OTHER PUBLICATIONS

International Search Report dated Jun. 29, 2021, issued for International Application No. PCT/JP2021/016127 (2 pages).

*Primary Examiner* — Karabi Guharay
(74) *Attorney, Agent, or Firm* — Nixon & Vanderhye P.C.

(57) ABSTRACT

A spark plug includes: a cylindrical insulator; a center electrode, held on an inner circumferential side of the insulator, protruding from the insulator toward a tip end side; a cylindrical housing holding the insulator on an inner circumferential side; a ground electrode forming a discharge gap between the ground electrode and the center electrode on the inner circumferential side of the housing; and a plug cover provided in a tip end portion of the housing to cover a pre-combustion chamber in which the discharge gap is arranged. The plug cover is provided with an injection hole that communicates the pre-combustion chamber to the outside. The ground electrode includes a discharge-side end portion that faces the discharge gap and a joining-side end portion that is joined to the housing. The discharge-side end portion is arranged further toward a base end side in an axial direction than the joining-side end portion is.

17 Claims, 10 Drawing Sheets

(56) References Cited

U.S. PATENT DOCUMENTS

| | | | | |
|---|---|---|---|---|
| 2015/0194793 | A1 | 7/2015 | Yamanaka | |
| 2017/0047712 | A1 * | 2/2017 | Niessner | B22F 3/225 |
| 2018/0123324 | A1 | 5/2018 | Niessner et al. | |
| 2018/0219356 | A1 | 8/2018 | Jung | |
| 2020/0386147 | A1 | 12/2020 | Bertsch | |

FOREIGN PATENT DOCUMENTS

| | | |
|---|---|---|
| DE | 10 2012 022 872 | 5/2014 |
| DE | 10 2017 221 517 | 6/2019 |
| DE | 10 2018 211 009 | 1/2020 |
| WO | 01/50017 | 7/2001 |

* cited by examiner

SPARK PLUG FOR INTERNAL COMBUSTION ENGINE

CROSS-REFERENCE TO RELATED APPLICATION

The present application is a continuation application of International Application No. PCT/JP2021/016127, filed on Apr. 21, 2021, which claims priority to Japanese Patent Application No. 2020-100406, filed on Jun. 9, 2020. The contents of these applications are incorporated herein by reference in their entirety.

BACKGROUND

Technical Field

The present disclosure relates to a spark plug for an internal combustion engine.

Related Art

There are spark plugs which have a plug cover provided in a tip end portion of a housing to form a pre-combustion chamber. In the spark plugs, a configuration is known in which a discharge gap is formed further toward a base end side than the tip end of the housing is. In this configuration, a ground electrode is attached so as to pass through a through hole that is provided in a side wall of the housing.

SUMMARY

One aspect of the present disclosure provides a spark plug for an internal combustion engine including: a cylindrical insulator; a center electrode that is held on an inner circumferential side of the insulator and protrudes toward a tip end side from the insulator; a cylindrical housing that holds the insulator on an inner circumferential side; a ground electrode that forms a discharge gap between the ground electrode and the center electrode on the inner circumferential side of the housing; and a plug cover that is provided in a tip end portion of the housing so as to cover a pre-combustion chamber in which the discharge gap is arranged, in which the plug cover is provided with an injection hole that communicates the pre-combustion chamber to the outside, the ground electrode includes a discharge-side end portion that faces the discharge gap and a joining-side end portion that is joined to the housing, and the discharge-side end portion is arranged further toward a base end side in an axial direction than the joining-side end portion is.

DESCRIPTION OF THE EMBODIMENTS

Figure 1:
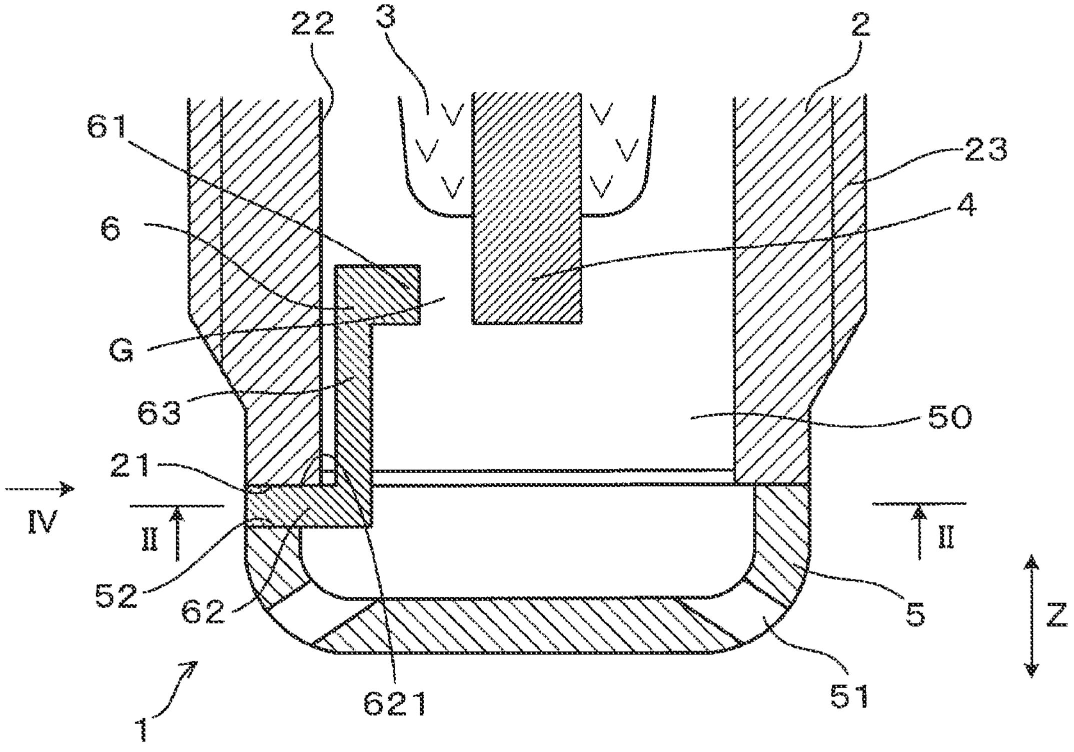
FIG. 1 is a cross-sectional view of a region around a tip end portion of a spark plug according to a first embodiment, taken along an axial direction.

There are spark plugs which have a plug cover provided in a tip end portion of a housing to form a pre-combustion chamber. German Patent Application Publication No. 102017221517 discloses a configuration in which, in the spark plug, a discharge gap is formed further toward a base end side than the tip end of the housing is. In the spark plug disclosed in German Patent Application Publication No. 102017221517, the discharge gap is provided in a position such as that described above, and thus a distance from the housing to a tip end of the plug cover can be made short. As a result, heat dissipation of the plug cover can be improved. To actualize a configuration such as this, in the above-described spark plug, a ground electrode is attached so as to pass through a through hole that is provided in a side wall of the housing.

In the spark plug disclosed in German Patent Application Publication No. 102017221517, the through hole is required to be provided in the side wall of the housing and the ground electrode is required to be passed through the through hole and joined. Therefore, a manufacturing process of the spark plug is complex.

It is thus desired to provide a spark plug for an internal combustion engine that enables simplification of a manufacturing process.

A first exemplary embodiment of the present disclosure provides a spark plug for an internal combustion engine including: a cylindrical insulator; a center electrode that is held on an inner circumferential side of the insulator and protrudes toward a tip end side from the insulator; a cylindrical housing that holds the insulator on an inner circumferential side; a ground electrode that forms a discharge gap between the ground electrode and the center electrode on the inner circumferential side of the housing; and a plug cover that is provided in a tip end portion of the housing so as to cover a pre-combustion chamber in which the discharge gap is arranged, in which the plug cover is provided with an injection hole that communicates the pre-combustion chamber to the outside, the ground electrode includes a discharge-side end portion that faces the discharge gap and a joining-side end portion that is joined to the housing, and the discharge-side end portion is arranged further toward a base end side in an axial direction than the joining-side end portion is. The discharge-side end portion of the ground electrode is arranged so as to oppose the center electrode in a plug radial direction.

A second exemplary embodiment of the present disclosure provides a spark plug for an internal combustion engine including: a cylindrical insulator; a center electrode that is held on an inner circumferential side of the insulator and protrudes toward a tip end side from the insulator; a cylindrical housing that holds the insulator on an inner circumferential side; a ground electrode that forms a discharge gap between the ground electrode and the center electrode on the inner circumferential side of the housing; and a plug cover that is provided in a tip end portion of the housing so as to cover a pre-combustion chamber in which the discharge gap is arranged, in which the plug cover is provided with an injection hole that communicates the pre-combustion chamber to the outside, the ground electrode includes a discharge-side end portion that faces the discharge gap and a joining-side end portion that is joined to the housing, and the discharge-side end portion is arranged further toward a base end side in an axial direction than the joining-side end portion is. The ground electrode includes a relay portion that connects the joining-side end portion and the discharge-side end portion in the axial direction. The joining-side end portion is joined to a tip end surface of the housing. The relay portion is arranged along an inner circumferential surface of the housing.

In the above-described spark plug for an internal combustion engine, the ground electrode is such that the discharge-side end portion is arranged further toward the base end side in the axial direction than the joining-side end portion is. Therefore, the discharge gap can be formed further toward the base end side than the tip end portion of the housing is, while the joining-side end portion of the ground electrode is joined to the tip end portion of the housing or in a vicinity thereof. Consequently, a manufacturing process of the spark plug in which the discharge gap is provided on the inner circumferential side of the housing can be simplified.

As described above, according to the above-described exemplary embodiments, a spark plug for an internal combustion engine that enables simplification of a manufacturing process can be provided.

The above-described exemplary embodiments of the present disclosure will be further clarified through the detailed description below, with reference to the accompanying drawings.

First Embodiment

An embodiment of a spark plug for an internal combustion engine will be described with reference to FIG. 1 to FIG. 5.

As shown in FIG. 1, a spark plug 1 for an internal combustion engine according to the present embodiment includes a cylindrical insulator 3, a center electrode 4, a cylindrical housing 2, a ground electrode 6, and a plug cover 5.

Figure 2:
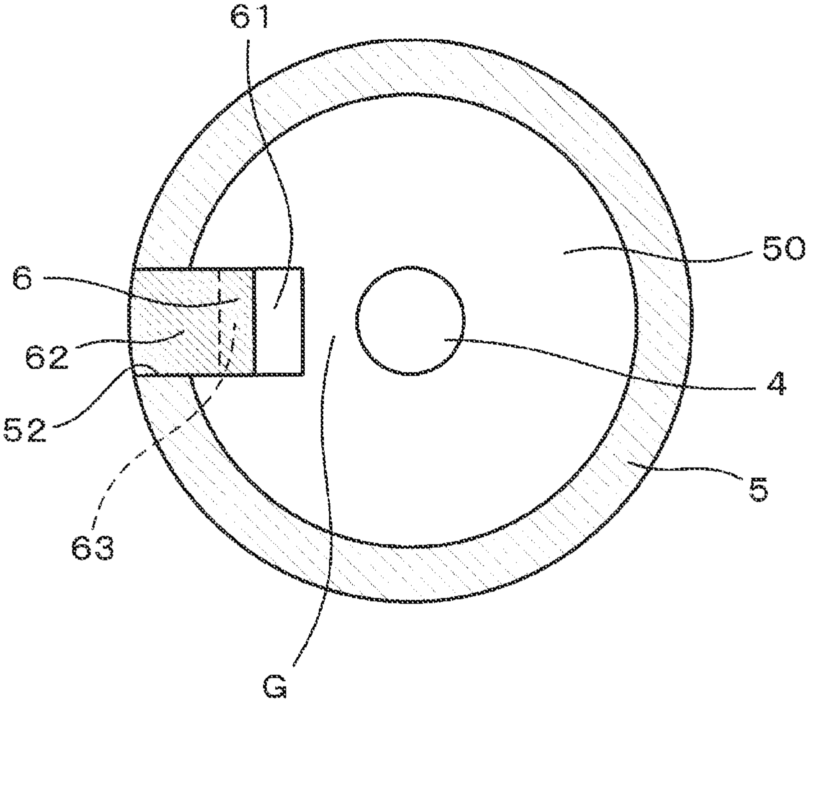
FIG. 2 is a cross-sectional view as viewed from arrows II-II in FIG. 1.

The center electrode 4 is held on an inner circumferential side of the insulator 3 and protrudes from the insulator 3 toward a tip end side. The housing holds the insulator 3 on an inner circumferential side. As shown in FIG. 1 and FIG. 2, the ground electrode 6 forms a discharge gap G between the ground electrode 6 and the center electrode 4 on the inner circumferential side of the housing 2. The plug cover 5 is provided in a tip end portion of the housing 2 so as to cover a pre-combustion chamber 50 in which the discharge gap G is arranged.

An injection hole 51 that communicates the pre-combustion chamber 50 to the outside is provided in the plug cover 5. The ground electrode 6 includes a discharge-side end portion 61 that faces the discharge gap G and a joining-side end portion 62 that is joined to the housing 2. As shown in FIG. 1, the discharge-side end portion 61 is arranged further toward a base end side in an axial direction Z than the joining-side end portion 62 is.

Figure 3:
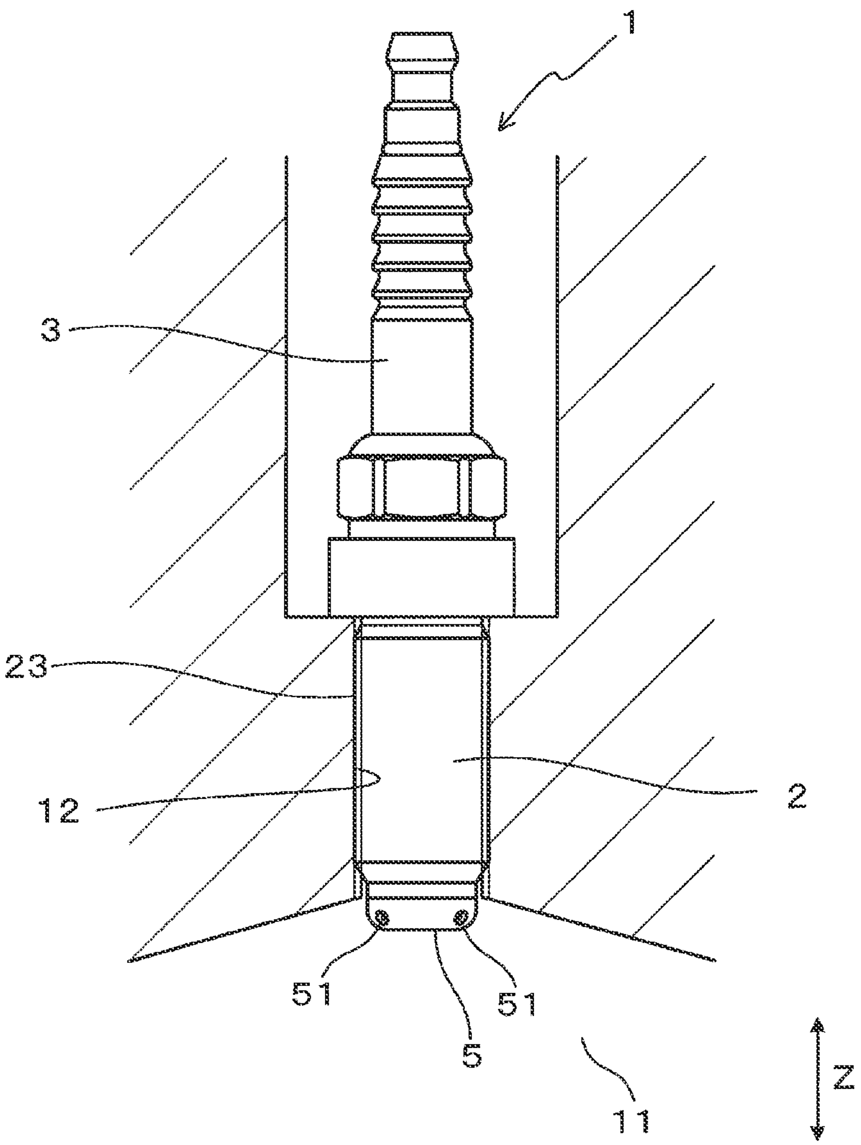
FIG. 3 is a front view of the spark plug attached to an internal combustion engine according to the first embodiment.

For example, the spark plug 1 according to the present embodiment can be used as an ignition means of an internal combustion engine for an automobile, cogeneration, and the like. In addition, as shown in FIG. 3, one end in the axial direction Z of the spark plug 1 is arranged in a combustion chamber of the internal combustion engine. The combustion chamber of the internal combustion engine is referred to as a "main combustion chamber 11" relative to the above-described "pre-combustion chamber 50." A side in the axial direction Z of the spark plug 1 that is exposed to the main combustion chamber 11 is referred to as a tip end side and a side opposite the tip end side is referred to as a base end side.

As shown in FIG. 1. the plug cover 5 is joined to the tip end portion of the housing 2 by welding or the like. In a state in which the spark plug 1 is attached to the internal combustion engine, the plug cover 5 segments the pre-combustion chamber 50 from the main combustion chamber 11. According to the present embodiment, a plurality of injection holes 51 are formed in the plug cover 5. Each injection hole 51 is tilted so as to be oriented to become closer to the tip end side in an outward radial direction toward an outer circumferential side. A flame that is generated in the pre-combustion chamber 50 is injected from the injection holes 51 into the main combustion chamber 11.

As shown in FIG. 1, the ground electrode 6 includes a relay portion 63 that connects the joining-side end portion 62 and the discharge-side end portion 61 in the axial direction Z. The joining-side end portion 62 is joined to a tip end surface 21 of the housing 2. The relay portion 63 is arranged along an inner circumferential surface 22 of the housing 2. The relay portion 63 is erected in the axial direction Z.

For example, the ground electrode 6 is configured by a metal member that is made of a nickel-based alloy. The discharge-side end portion 61 protrudes in a direction that is orthogonal to the axial direction Z from a base end portion of the relay portion 63. The joining-side end portion 62 protrudes in a direction that is orthogonal to the axial direction Z, toward a side opposite the discharge-side end portion 61, from a tip end portion of the relay portion 63. As shown in FIG. 2, the ground electrode 6 is attached such that a direction from the joining-side end portion 62 to the discharge-side end portion 61 is a direction toward a plug center axis in a plug radial direction, when viewed from the axial direction Z. Here, the plug center axis refers to a center axis of the spark plug 1. The plug radial direction refers to a direction along a straight line that is orthogonal to the plug center axis.

Figure 4:
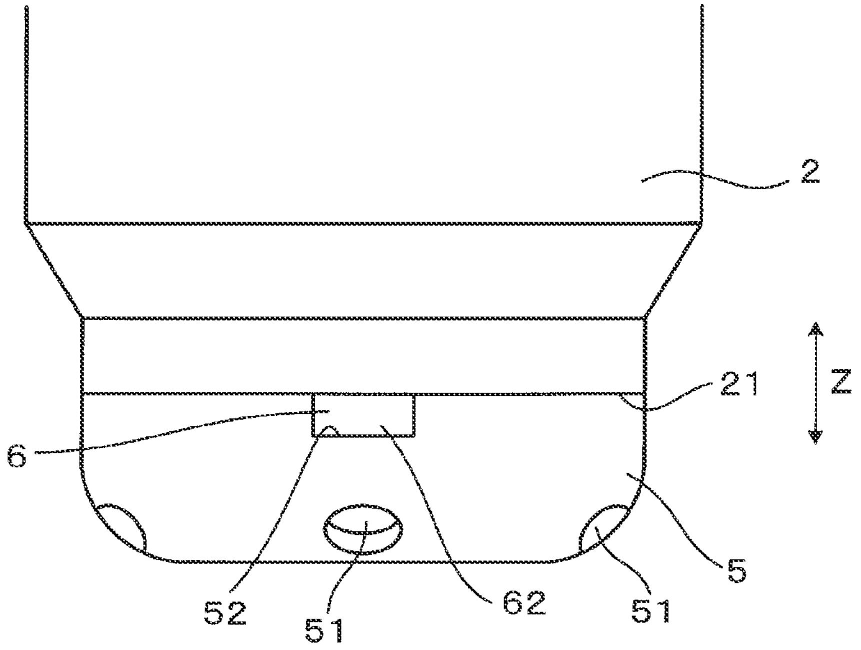
FIG. 4 is a front view of the region around the tip end portion of the spark plug according to the first embodiment.

As shown in FIG. 1 and FIG. 4, the ground electrode 6 is joined in a state in which a base-end-side surface 621 of the joining-side end portion 62 is in surface-contact with the tip end surface of the housing 2. In addition, the discharge-side end portion 61 of the ground electrode 6 is arranged so as to oppose the center electrode 4 in the plug radial direction. The discharge-side end portion 61 is arranged so as to oppose an outer circumferential surface of a tip end portion of the center electrode 4. The discharge gap G is formed between the discharge-side end portion 61 and the outer circumferential surface of the center electrode 4. That is, an end surface on the plug-center-axis side of the discharge-side end portion 61 opposes the outer circumferential surface of the center electrode 4 and configures a discharge surface.

According to the present embodiment, the joining-side end portion 62 is arranged in a base-end cutout portion 52 that is provided in the plug cover 5. As described above, while the plug cover 5 is joined to the tip end portion of the housing 2, the base-end cutout portion 52 is formed in a portion of an edge thereof on the joining side. The joining-side end portion 62 of the ground electrode 6 is arranged between the base-end cutout portion 52 and the tip end surface of the housing 2. The joining-side end portion 62 and the plug cover 5 can be joined to each other by welding or the like. However, the configuration can be such that the joining-side end portion 62 is not joined to the plug cover 5.

In this manner according to the present embodiment, the ground electrode 6 is such that the joining-side end portion 62 is arranged further toward the tip end side than the tip end of the housing 2 is, and the discharge-side end portion 61 is arranged further toward the base end side than the tip end of the housing 2 is. In accompaniment, the discharge gap G is formed further toward the base end side than the tip end of the housing 2 is. In addition, the tip end of the center electrode 4 is arranged further toward the base end side than the tip end of the housing 2 is.

For example, the housing 2 is made of a metal such as low-carbon steel. As shown in FIG. 1 and FIG. 3, the housing 2 has an attachment screw portion 23 on the outer circumferential surface. As shown in FIG. 3, the spark plug 1 is attached to the internal combustion engine by the attachment screw portion 23 being screwed to a female screw portion of a plug hole 12 that is provided in an engine head or the like of the internal combustion engine. The spark plug 1 is attached to the internal combustion engine in a state in which a portion on the tip end side is exposed to the main combustion chamber 11.

Next, working effects according to the present embodiment will be described.

In the spark plug 1 for an internal combustion engine described above, the ground electrode 6 is such that the discharge-side end portion 61 is arranged further toward the base end side in the axial direction Z than the joining-side end portion 62 is. Therefore, the discharge gap G can be formed further toward the base end side than the tip end portion of the housing 2 is, while the joining-side end portion 62 of the ground electrode 6 is joined to the tip end portion of the housing 2. Consequently, a manufacturing process of the spark plug 1 that includes the discharge gap G on the inner circumferential side of the housing 2 can be simplified.

As shown in FIG. 3, in the spark plug 1 in which the plug cover 5 is provided in the tip end portion of the housing 2 and the pre-combustion chamber 50 is formed, the plug cover 5 is exposed in the main combustion chamber 11. Therefore, a temperature of the plug cover 5 tends to increase. When the temperature of the plug cover 5 becomes too high, issues such as pre-ignition more easily occur. Therefore, minimization of an amount of protrusion of the plug cover 5 into the main combustion chamber 11 is required. Therefore, as shown in FIG. 1, the discharge gap G is arranged on the inner circumferential side of the housing 2, that is, further toward the base end side than the tip end of the housing 2 is, as shown in FIG. 3, and thus the amount of protrusion of the plug cover 5 from the housing 2 can be reduced. Consequently, heat from the plug cover 5 is more easily released to the engine head through the housing 2, and temperature increase in the plug cover 5 can be more easily suppressed.

Meanwhile, the flame generated in the pre-combustion chamber 50 is sufficiently grown and subsequently injected from the injection holes 5, and thus a strong flame jet can be injected into the main combustion chamber 11. From this perspective, there is a demand for increase in a distance in the axial direction Z between the discharge gap G and the injection holes 51. To accommodate both this demand and the above-described demand to reduce the amount of protrusion of the plug cover 5, the discharge gap G is required to be formed further toward the base end side than the tip end of the housing 2 is.

However, when the discharge gap G is formed further toward the base end side than the tip end of the housing 2 is, an attachment process of the ground electrode to the housing 2 becomes complex. For example, providing a through hole in the housing 2 in the plug radial direction, and the ground electrode being passed through the through hole and attached to the housing 2 can be considered. However, in this case, a step of forming the through hole in the housing 2 is required. The manufacturing process becomes complex. In addition, when the through hole is provided in the housing in a position in which the attachment screw portion 23 is formed, a portion of the attachment screw portion 23 is lost, and a fastening state of the spark plug 1 to the engine head being affected is a concern.

It is thus desired to manufacture the spark plug 1 that includes the discharge gap G further toward the base end side than the tip end of the housing 2 is, by a simple manufacturing process. Here, as described above, the ground electrode 6 is configured such that the discharge-side end portion 61 is arranged further toward the base end side in the axial direction Z than the joining-side end portion 62 is. Consequently, the discharge gap G can be easily formed further toward the base end side than the tip end of the housing 2 is, by the ground electrode 6 being joined to the tip end portion of the housing 2.

Figure 5:
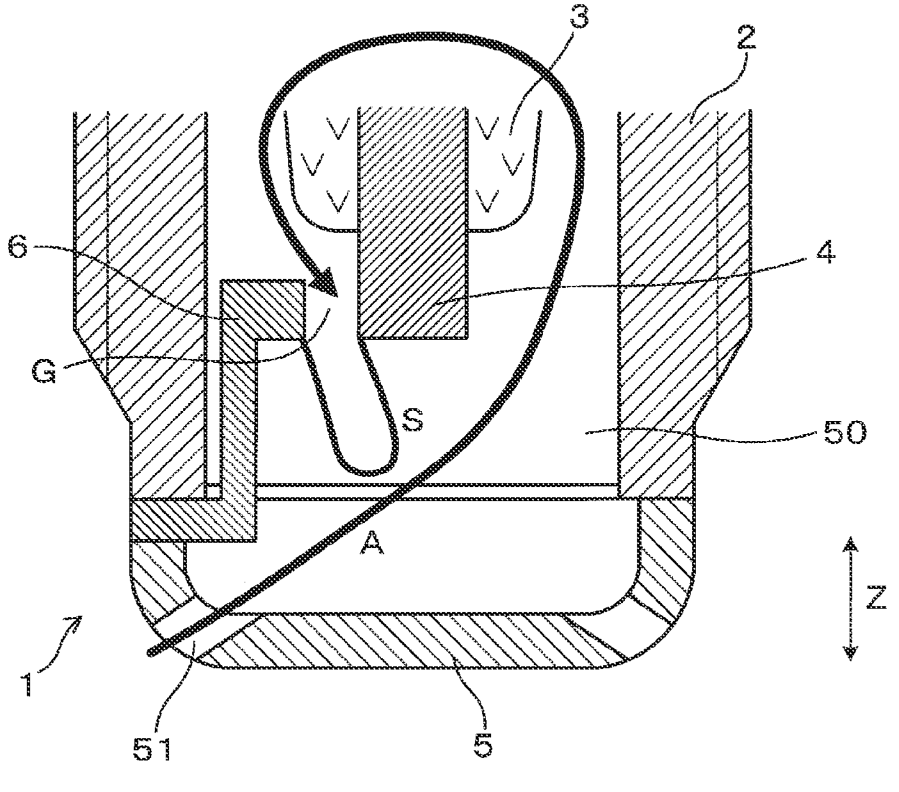
FIG. 5 is a cross-sectional explanatory diagram of a state of air flow and discharge according to the first embodiment.

In addition, the discharge-side end portion 61 of the discharge electrode 6 is arranged so as to oppose the center electrode 4 in the plug radial direction. As a result, as shown in FIG. 5, an air flow A in the pre-combustion chamber 50 can easily stretch a discharge S that is generated in the discharge gap G. Consequently, ignitability in the pre-combustion chamber 50 can be improved, and further, ignitability in the main combustion chamber 11 can be improved.

For example, as shown in FIG. 5, in a compression stroke or the like of the internal combustion engine, an air flow is introduced from the injection holes 51 to the pre-combustion chamber 50. This air flow A is thought to form a tumble flow in the pre-combustion chamber 50. That is, the air flow A that, after being introduced from a portion of the injection holes 51, temporarily flows further toward the base end side than the discharge gap G is, and then subsequently flows toward the tip end side in the axial direction Z is thought to be formed. In this case, the discharge gap G is provided in a position that opposes the outer circumferential surface of the center electrode 4 in the plug radial direction, and thus the discharge S generated in the discharge gap G can be more easily stretched to the tip end side. As a result, the flame is more easily formed and grown in the pre-combustion chamber 50. Consequently, ignitability can be improved.

Furthermore, as shown in FIG. 1, the ground electrode 6 includes the relay portion 63. In addition, the joining-side end portion 62 is joined to the tip end surface 21 of the housing 2 and the relay portion 63 is arranged long the inner circumferential surface 22 of the housing 2. As a result, while the ground electrode 6 is joined to the tip end portion of the housing 2, the discharge-side end portion 61 can be made to more easily and accurately oppose the center electrode 4 on the inner circumferential side of the housing 2. In addition, a length in the axial direction Z of the relay portion 63 is increased, and thus, the discharge gap G being formed further toward the base end side can be facilitated. Moreover, the relay portion 63 is arranged along the inner circumferential surface 22 of the housing 2, and thus the relay portion 63 can be suppressed from interfering with air flow and flame growth in the pre-combustion chamber 50.

Here, in above-described FIG. 5 and the description with reference thereto, the case in which the tumble flow is formed in the pre-combustion chamber 50 is described. However, the spark plug 1 according to the present embodiment can improve ignitability in a case in which a swirl flow (see arrow As in FIG. 11) is formed in the pre-combustion chamber 50, as well. That is, in this case, the discharge is stretched along a plug circumferential direction by an air flow that passes through the discharge gap G.

Here, when the swirl flow is formed in the pre-combustion chamber 50, as according to a fourth embodiment (see FIG. 11 and FIG. 12) described hereafter, a tapered surface being formed on an inner circumferential side surface 632 of the relay portion 63 of the ground electrode 6 is also effective.

Meanwhile, when the tumble flow is generated in the pre-combustion chamber 50, as according to an eighth embodiment (see FIG. 17) described hereafter, a pair of discharge surfaces being tilted is also effective.

As described above, according to the present embodiment, a spark plug for an internal combustion engine that enables simplification of the manufacturing process can be provided.

Second Embodiment

Figure 6:
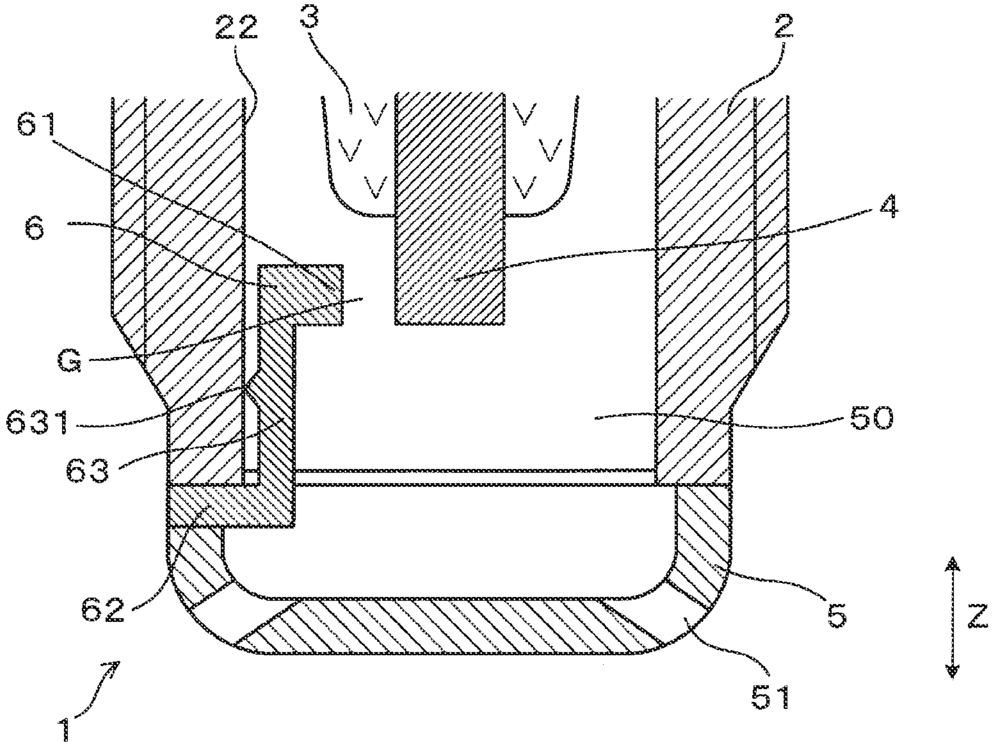
FIG. 6 is a cross-sectional view of a region around a tip end portion of a spark plug according to a second embodiment, taken along the axial direction.

As shown in FIG. 6, a present embodiment is an embodiment in which the relay portion 63 includes a protruding portion 631 that protrudes toward the inner circumferential surface 22 of the housing 2.

The protruding portion 631 is formed in a position that is further toward the tip end side than the discharge-side end portion 61 is and further toward the base end side than the joining-side end portion 62 in the axial direction Z is. The protruding portion 631 is in contact with the inner circumferential surface 22 of the housing 2.

Other configurations are similar to those according to the first embodiment. Here, reference numbers used according to the second and subsequent embodiments that are the same as the reference numbers used according to earlier embodiments indicate constituent elements and the like that are similar to those according to the earlier embodiments, unless otherwise stated.

According to the present embodiment, the protruding portion 631 is provided in the relay portion 63. Therefore, when the ground electrode 6 is attached to the housing 2, positioning in the plug radial direction can be more easily accurately performed. That is, a protrusion height of the protruding portion 631 is appropriately set in advance, when the protruding portion 631 is placed in contact with the inner circumferential surface 22 of the housing 2. Thus, the position of the discharge-side end portion 61 in the plug radial direction can be accurately determined. As a result, the discharge gap G of an appropriate size can be easily and accurately formed.

In addition, in a case in which the ground electrode 6 can be deformed to a certain extent, when the joining-side end portion 62 is moved toward the outer circumferential side while the protruding portion 631 is placed in contact with the inner circumferential surface 22 of the housing 2, the discharge-side end portion 61 moves toward the center electrode 4 side. That is, at a stage before the ground electrode 6 is fixed, the joining-side end portion 62 is slid in the plug radial direction with the protruding portion 631 as a fulcrum, and thus minute adjustment of the size of the discharge gap G can be performed. Consequently, minute adjustment of the discharge gap G that is arranged further toward the base end side than the tip end of the housing 2 is can be easily performed.

Furthermore, working effects similar to those according to the first embodiment are obtained.

Figure 7:
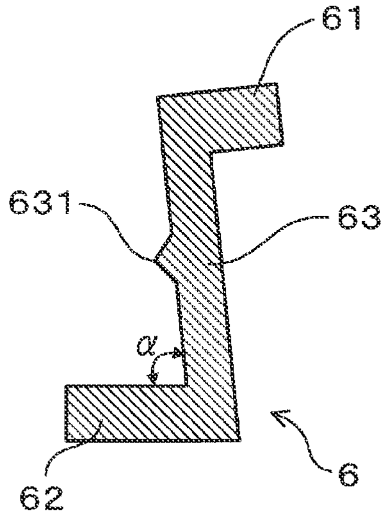
FIG. 7 is a cross-sectional view of an example of a ground electrode according to the second embodiment.

Here, as shown in FIG. 7, as a shape of the ground electrode 6 in a state before attachment to the housing 2, a shape in which an angle $\alpha$ that is formed between the joining-side end portion 62 and the relay portion 63 is an acute angle can be considered. In this case, when the housing 2 is attached, the protruding portion 631 can be pressed against the inner circumferential surface 22 of the housing 2, and the ground electrode 6 can be elastically deformed such that the angle $\alpha$ is widened. As a result of adjustment of the angle $\alpha$ at this time, the position of the discharge-side end portion 61 of the ground electrode 6 can be adjusted and the size of the discharge gap G can be adjusted.

Figure 8:
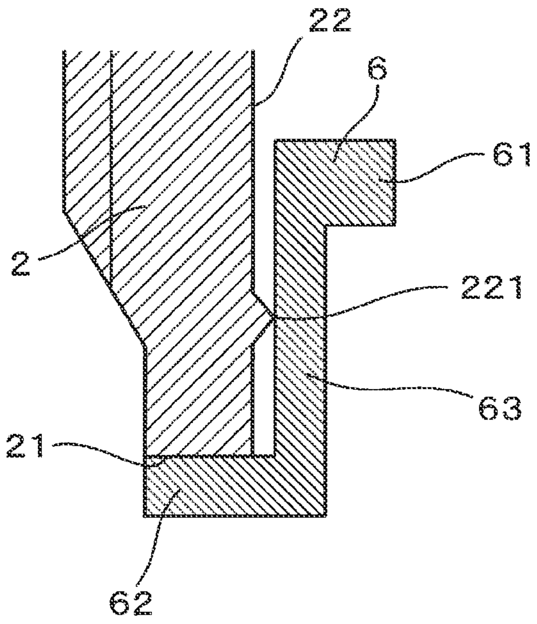
FIG. 8 is a cross-sectional view of the ground electrode attached to a housing in a modification according to the second embodiment.

In addition, as a modification according to the present embodiment, as shown in FIG. 8, a protruding portion 221 that protrudes toward the relay portion 63 of the ground electrode 6 can be provided on the inner circumferential surface 22 of the housing 2. In this case as well, working effects similar to the above-described working effects can be obtained. However, the embodiment in which the protruding portion 631 is provided in the ground electrode 6 is preferable from the perspective of manufacturability and the like.

Third Embodiment

Figure 9:
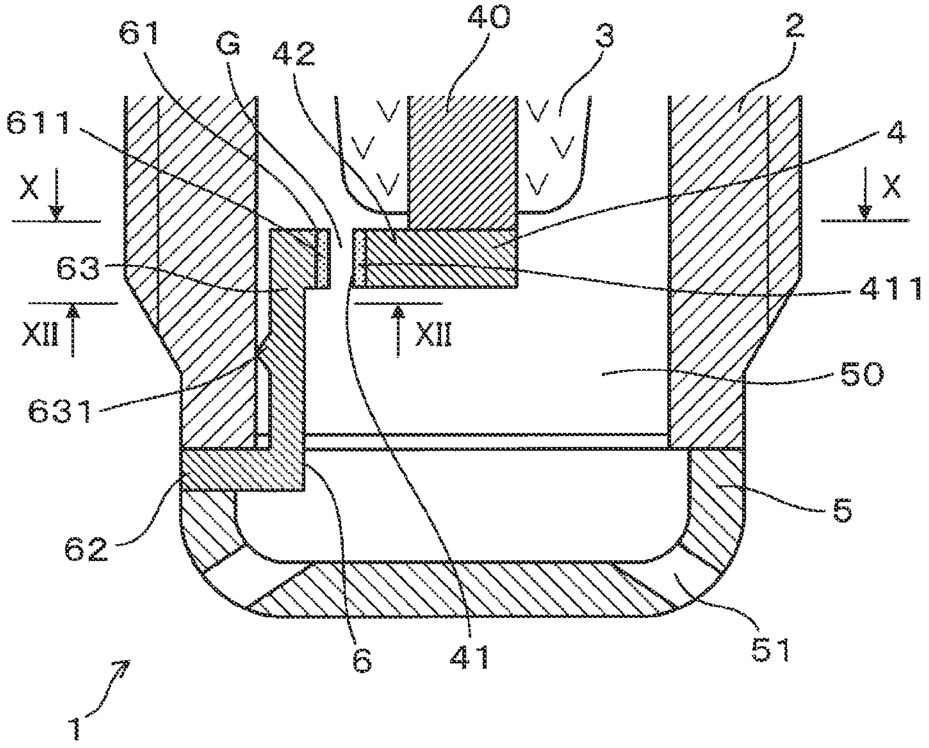
FIG. 9 is a cross-sectional view of a region around a tip end portion of a spark plug according to a third embodiment, taken along the axial direction.
Figure 10:
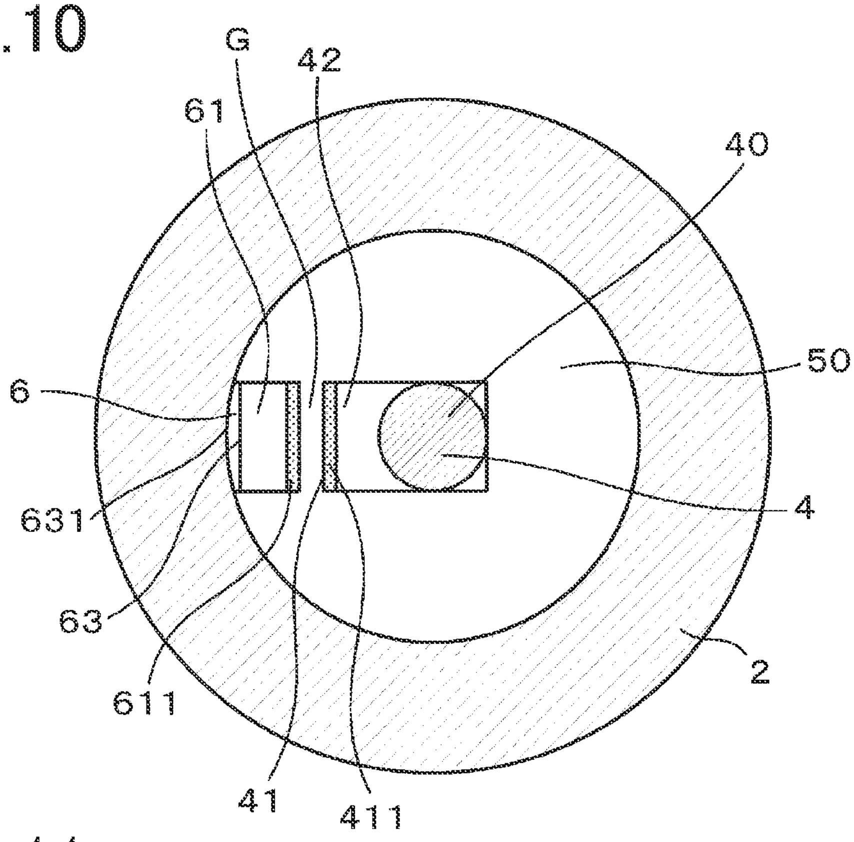
FIG. 10 is a cross-sectional view as viewed from arrows X-X in FIG. 9.

As shown in FIG. 9 and FIG. 10, a present embodiment is an embodiment in which the center electrode 4 has a flat discharge surface 41 that has a flat planar shape on the discharge gap G side.

According to the present embodiment, an extending portion 42 is provided in the tip end portion of the center electrode 4. The extending portion 42 protrudes toward the ground electrode 6 side, from a base material 40 of the center electrode 4 toward the outer side in the plug radial direction. The extending portion 42 is a separate member from the base material 40 of the center electrode 4 and is configured so as to be joined to a tip end surface of the base material 40. This extending portion 42 can be a member that has a substantially rectangular parallelepiped shape.

A flat surface that is provided in the extending portion 42 opposes the discharge-side end portion 61 of the ground electrode 6. That is, the flat surface on the discharge gap G side of the extending portion 42 serves as the above-described flat discharge surface 41.

According to the present embodiment, a tip 411 is provided on the flat discharge surface 41 of the extending portion 42.

In addition, according to the present embodiment, a tip 611 is also provided in the discharge-side end portion 61 of the ground electrode 6. For example, the tips 411 and 611 can be made of a noble metal, such as iridium or platinum, or an alloy thereof.

However, the configuration can be such that either or both of the tip 411 in the center electrode 41 and the tip 611 in the ground electrode 6 are not provided.

Other configurations are similar to those according to the second embodiment.

According to the present embodiment, the surface of the center electrode 4 that opposes the discharge gap G is the flat discharge surface 41 that is flat, and thus the discharge gap G can be suppressed from being enlarged due to electrode wear. That is, when the side surface of the center electrode 4 that has a circular columnar shape is the discharge surface as according to the first embodiment, the discharge gap G easily becomes bigger as a result of electrode wear due to discharge. In contrast, the flat discharge surface 41 is provided, and thus the discharge gap G can be suppressed from being enlarged.

In addition, according to the present embodiment, the tip 411 is provided on the flat discharge surface 41, and thus the discharge gap G can be further suppressed from being enlarged.

Furthermore, working effects similar to those according to the second embodiment are obtained.

Fourth Embodiment

Figure 11:
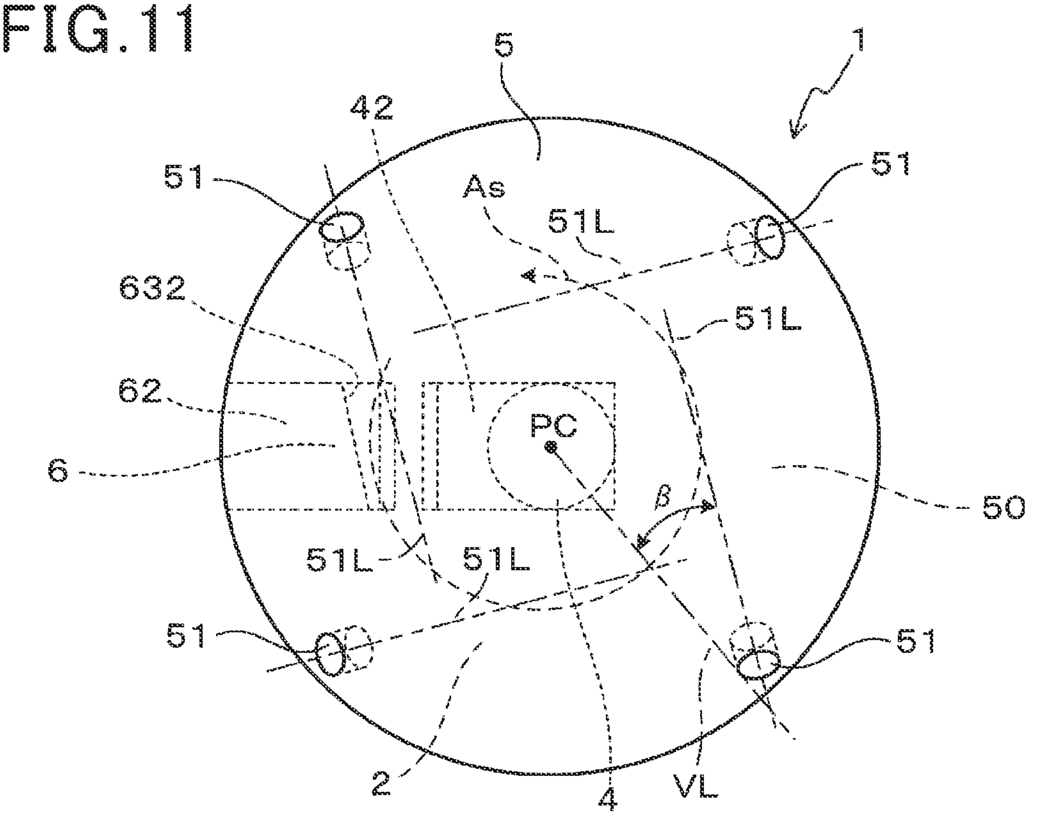
FIG. 11 is an explanatory diagram of a spark plug viewed from a tip end side according to a fourth embodiment.
Figure 12:
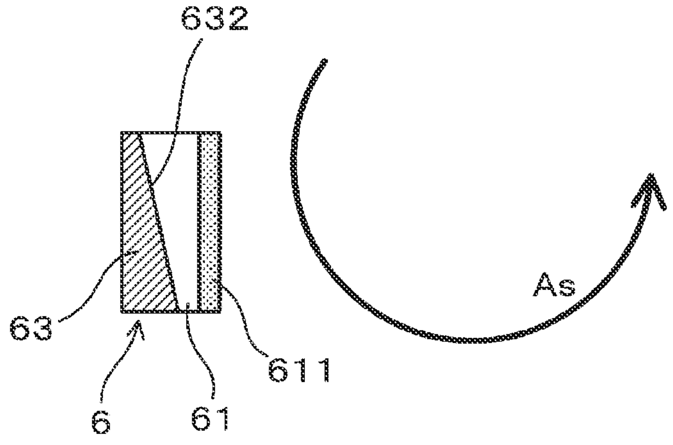
FIG. 12 is a cross-sectional explanatory diagram of a ground electrode according to the fourth embodiment and a diagram corresponding to a cross-section taken along the line XII-XII in FIG. 9.

As shown in FIG. 11 and FIG. 12, a present embodiment is an embodiment that is configured such that a swirl flow is formed in the pre-combustion chamber 50.

That is, the injection hole 51 is formed in the plug cover 5 such that a swirl flow is formed in the pre-combustion chamber 50. In addition, the inner circumferential side surface 632 of the relay portion 63 is tilted further toward the plug center axis side, from an upstream side toward a downstream side of a swirl flow As.

As shown in FIG. 11 and FIG. 12, the swirl flow As is an air flow that flows in a spiraling manner with a plug center axis PC as substantially the center.

The plug cover 5 includes a plurality of injection holes 51. In addition, as shown in FIG. 11, an injection hole extension line 51L of each injection hole 51 is formed so as to be shifted from the plug center axis PC. When viewed from the Z direction, an angle (3 between a virtual straight line VL that extends the plug radial direction and passes through the injection hole 51 and the plug center axis PC, and the injection hole extension line 51L is an acute angle. According to the present embodiment, the angles 13 related to each injection hole 51 are equal to each other.

According to the present embodiment, the inner circumferential side surface 632 of the relay portion 63 of the ground electrode 6 is a tapered surface. However, as long as the inner circumferential side surface 632 is tilted further toward the plug center axis PC side, from the upstream side toward the downstream side of the swirl flow As, the inner circumferential side surface 632 can also be a curved surface. In this case, the inner circumferential side surface 632 is preferably a concave curved surface but may also be a convex curved surface.

Other configurations are similar to those according to the third embodiment.

In the case according to the present embodiment, the inner circumferential side surface 632 of the relay portion 63 can guide the swirl flow As. As a result, an air flow that passes through the vicinity of the discharge gap G is gradually led to the plug center axis PC side while flowing along the plug circumferential direction as the swirl flow As. Therefore, the discharge that is formed in the discharge gap G is more easily stretched toward a center portion of the pre-combustion chamber 50. As a result, a flame can be generated in a position that is farther from a side wall of the pre-combustion chamber 50, that is, the inner circumferential surface 22 of the housing 2. As a result, cooling loss can be suppressed, and flame growth in the pre-combustion chamber 50 can be promoted. Consequently, a flame jet that is injected from the pre-combustion chamber 50 to the main combustion chamber 11 can be strengthened.

In addition, working effects similar to those according to the third embodiment are obtained.

Fifth Embodiment

Figure 13:
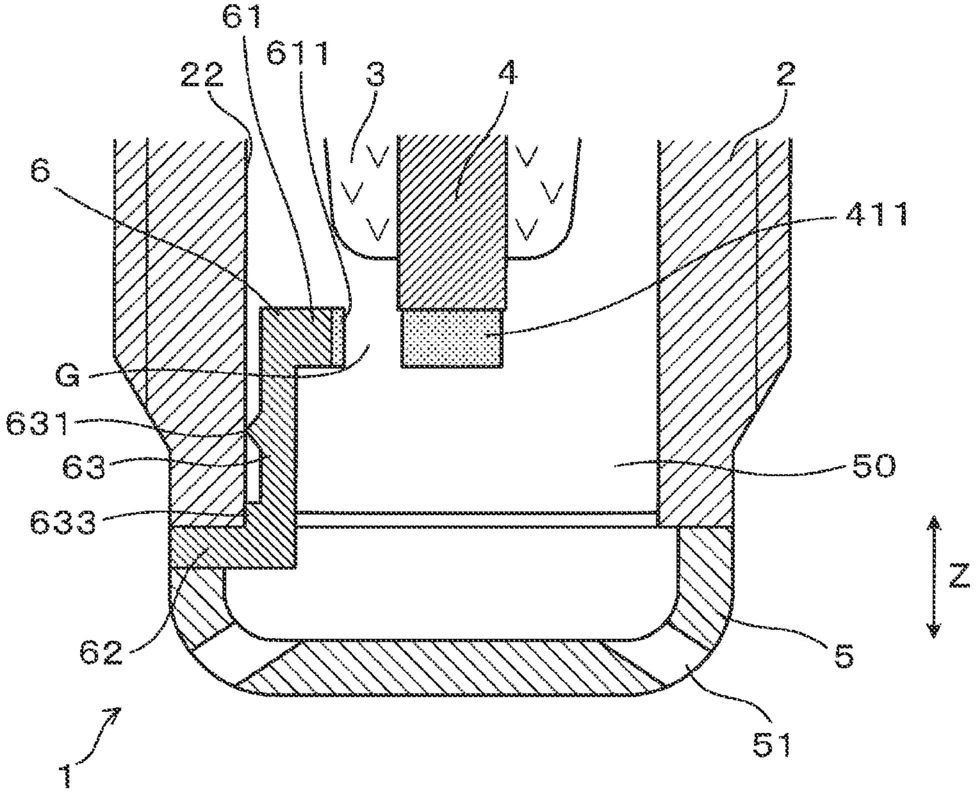
FIG. 13 is a cross-sectional view of a region around a tip end portion of a spark plug according to a fifth embodiment, taken along the axial direction.

As shown in FIG. 13, the present embodiment is an embodiment in which an additional protruding portion 633 that protrudes from the relay portion 63 in a same direction as the protruding portion 631 is provided in a position further toward the tip end side than the protruding portion 631 in the relay portion 63 of the ground electrode 6 is.

According to the present embodiment, the additional protruding portion 633 is formed between the relay portion 63 and the joining-side end portion 62.

In addition, according to the present embodiment, the tip 411 is joined to the tip end surface of the center electrode 4. In addition, the tip 611 is also joined to the discharge-side end portion 61 of the ground electrode 6. The tip 411 of the center electrode 4 and the tip 611 of the ground electrode 6 oppose each other in the plug radial direction. The discharge gap G is formed between the tip 411 of the center electrode 4 and the tip 611 of the ground electrode 6 that oppose each other in the plug radial direction in this manner.

Other configurations are similar to those according to the second embodiment.

According to the present embodiment, in both the protruding portion 631 and the additional protruding portion 633, the relay portion 63 of the ground electrode 6 can be placed in contact with the inner circumferential surface 22 of the housing 22. Therefore, during assembly of the ground electrode 6 to the housing 2, an attachment attitude of the ground electrode 6 can be stabilized. Consequently, the size of the discharge gap G can be more easily accurately formed.

In addition, working effects similar to those according to the second embodiment are obtained.

Sixth Embodiment

Figure 14:
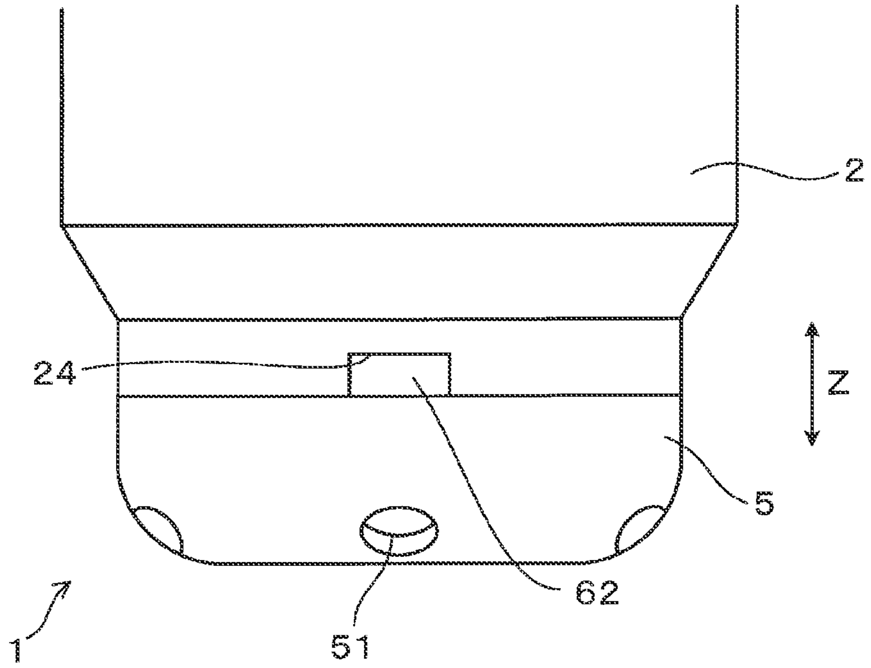
FIG. 14 is a front view of a region around a tip end portion of a spark plug according to a sixth embodiment.
Figure 15:
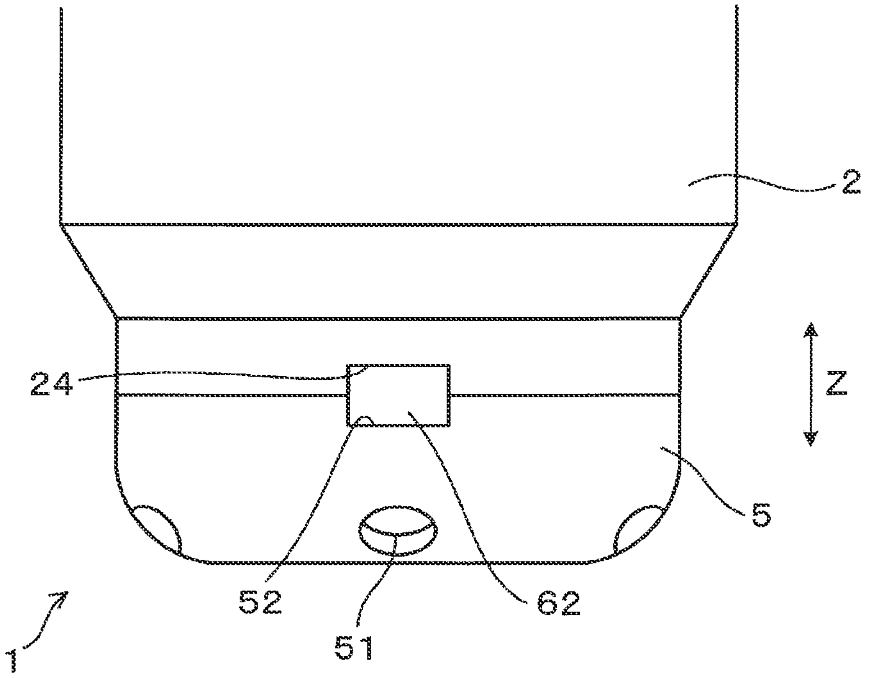
FIG. 15 is a front view of a region around a tip end portion of another spark plug according to the sixth embodiment.

As shown in FIG. 14 and FIG. 15, a present embodiment is an embodiment in which the joining-side end portion 62 of the ground electrode 6 is arranged in a tip-end cutout portion 24 that is provided on the tip end of the housing 2.

In the spark plug 1 shown in FIG. 14, a cutout portion is not provided in the plug cover 5. That is, according to the present embodiment, the plug cover 5 does not have the base-end cutout portion 52 according to the first embodiment.

In the spark plug 1 shown in FIG. 15, the tip end cutout portion 24 is provided in the housing 2 and the base-end cutout portion 52 is also provided in the plug cover 5. In addition, the housing 2 and the plug cover 5 are joined to each other such that the tip-end cutout portion 24 and the base-end cutout portion 52 overlap in the axial direction Z. Furthermore, the joining-side end portion 62 of the ground electrode 6 is arranged in a space that is formed by the tip-end cutout portion 24 and the base-end cutout portion 52.

Other configurations are similar to those according to the first embodiment.

In the case according to the present embodiment, when the ground electrode 6 is assembled to the housing 2, the tip-end cutout portion 24 provides a positioning function. As a result, assembly of the ground electrode 6 to the housing 2 can be facilitated. In addition, in the case of the spark plug 1 shown in FIG. 14, a structure of the plug cover 5 can be simplified.

Furthermore, working effects similar to those according to the first embodiment are obtained.

Seventh Embodiment

Figure 16:
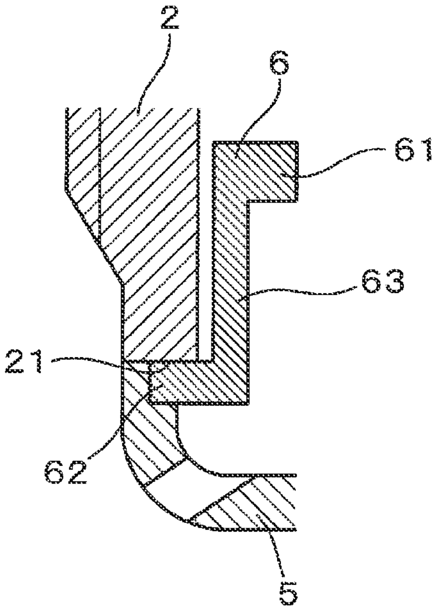
FIG. 16 is a cross-sectional view of a state of attachment of a ground electrode to a housing according to a seventh embodiment.

As shown in FIG. 16, a present embodiment is an embodiment in which the joining-side end portion 62 of the ground electrode 6 is not exposed toward the outer circumferential side of the housing 5 and the plug cover 5.

That is, the joining-side end portion 62 of the ground electrode 6 is arranged further toward the inner side than the outer circumferential surface of the housing 2 is and further toward the inner side than the outer circumferential surface of the plug cover 5 is. The joining-side end portion 62 engages with a portion on the inner circumferential side of the tip end surface 21 of the housing 2.

Other configurations are similar to those according to the first embodiment. In the case according to the present embodiment as well, working effects similar to those according to the first embodiment are obtained.

Eighth Embodiment

Figure 17:
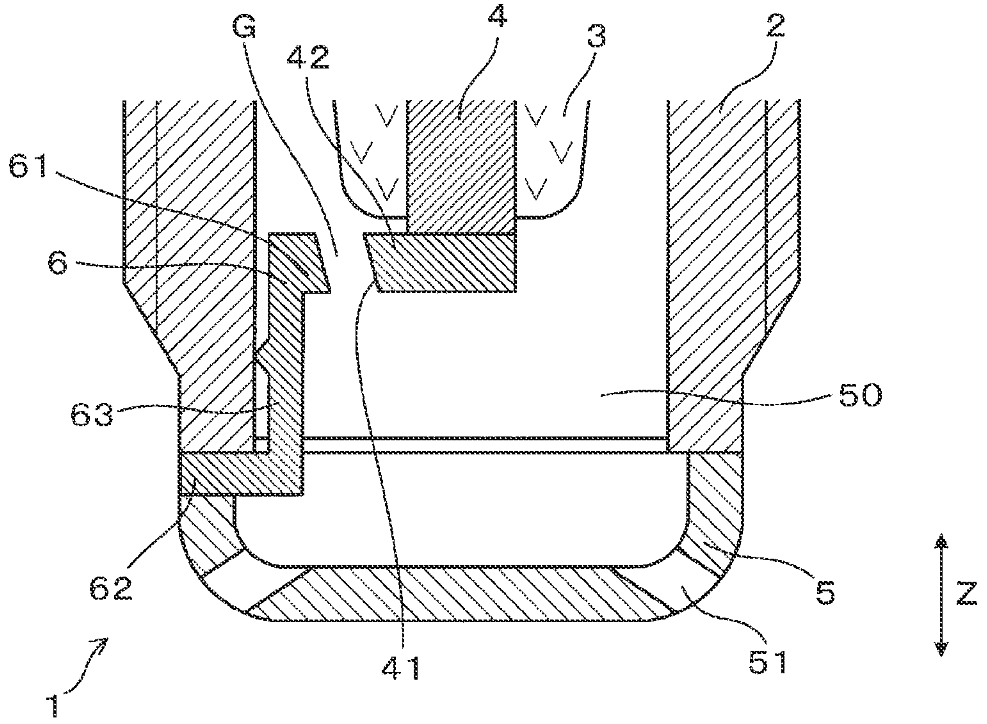
FIG. 17 is a cross-sectional view of a region around a tip end portion of a spark plug according to an eighth embodiment, taken along the axial direction.

As shown in FIG. 17, in a present embodiment, a pair of discharge surfaces that oppose each other with the discharge gap G therebetween are tilted so as to be oriented to become closer to the tip end side in the axial direction Z in an inward radial direction toward the plug center axis side.

That is, an end surface of the discharge-side end portion 61 of the ground electrode 6 that faces the discharge gap G is tilted further toward the plug center axis side, toward the tip end side in the axial direction Z. In addition, the flat discharge surface 41 of the center electrode 4 is also tilted toward the plug center axis side, toward the tip end side in the axial direction Z.

Furthermore, in the spark plug shown in FIG. 17, neither of the ground electrode 6 and the center electrode 4 is provided with a tip. However, the tip can be provided in either or both of the ground electrode 6 and the center electrode 4.

Other configurations are similar to those according to the third embodiment.

According to the present embodiment, for example, when a tumble flow (see arrow A in FIG. 5) is generated in the pre-combustion chamber 50, an air flow that is tilted relative to the axial direction can be considered to pass through the discharge gap G. The shape of the discharge gap G is formed along this flow, and thus the discharge can be more easily stretched.

In addition, working effects similar to those according to the third embodiment are obtained

Ninth Embodiment

Figure 18:
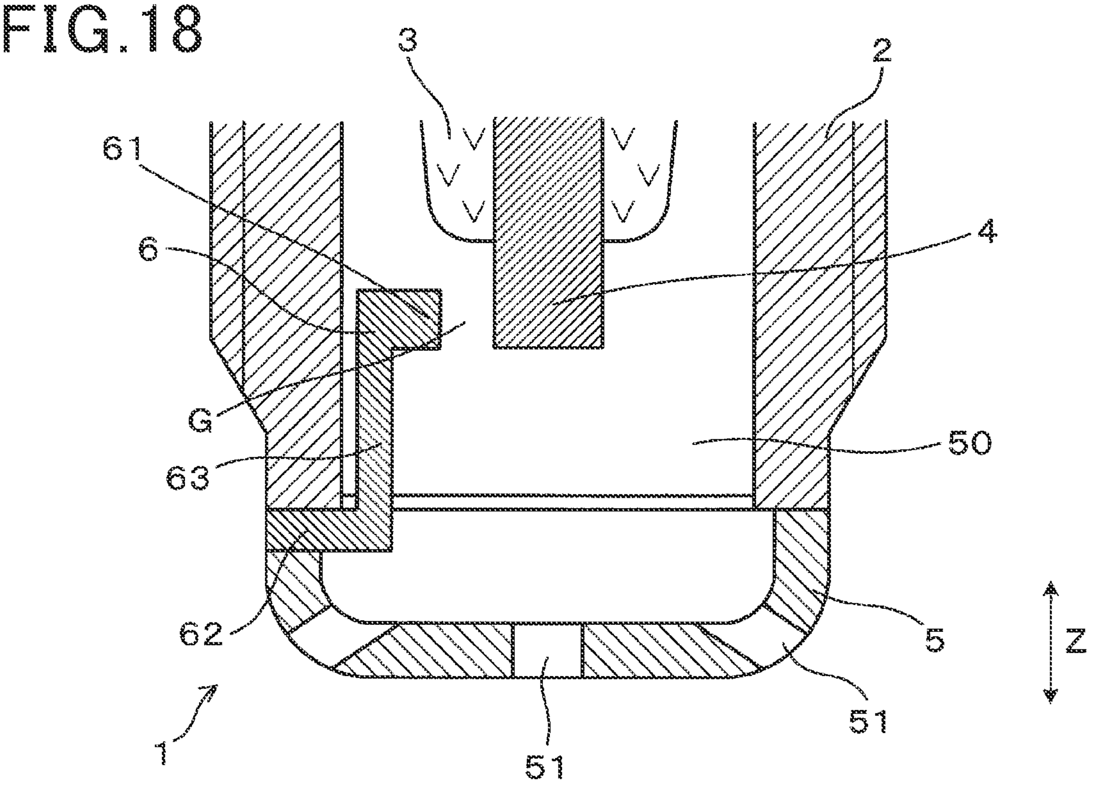
FIG. 18 is a cross-sectional view of a region around a tip end portion of a spark plug according to a ninth embodiment, taken along the axial direction.

As shown in FIG. 18, a present embodiment is an embodiment in which the injection hole 51 that passes through in the axial direction Z is provided in a position that overlaps the plug center axis in the plug cover 5.

The injection hole 51 in the axial direction Z is formed in a position that overlaps the center electrode 4 in the axial direction Z.

Other configurations are similar to those according to the first embodiment.

According to the present embodiment as well, working effects similar to those according to the first embodiment can be obtained.

Tenth Embodiment

Figure 19:
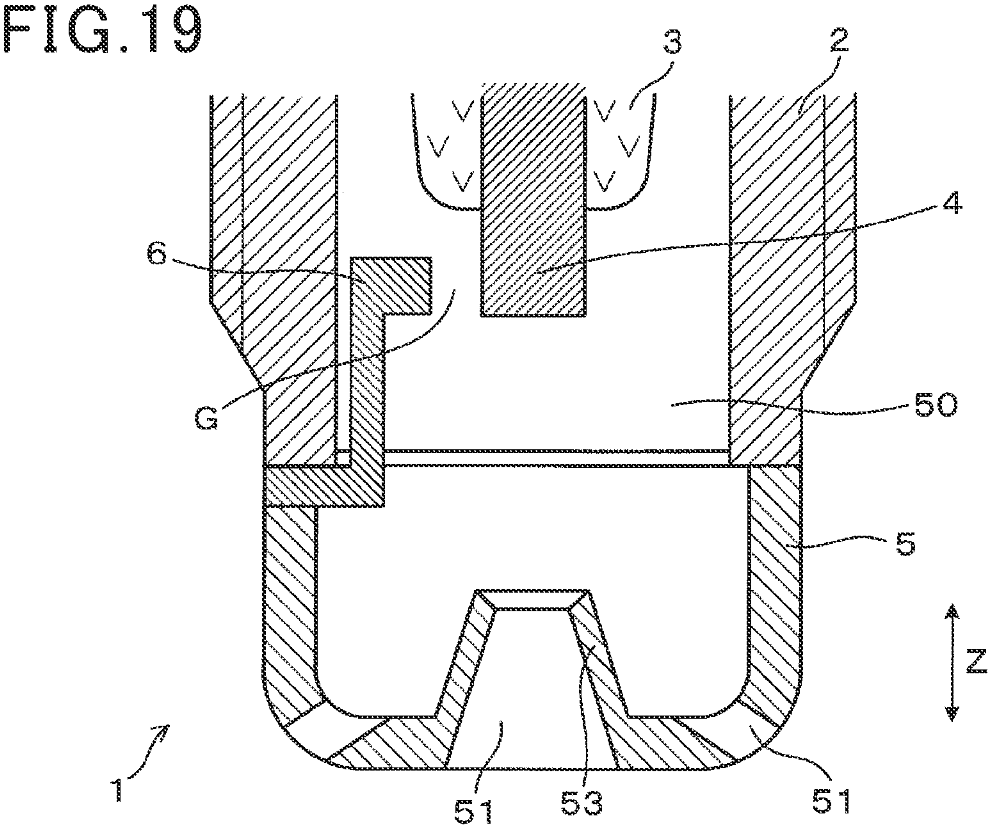
FIG. 19 is a cross-sectional view of a region around a tip end portion of a spark plug according to a tenth embodiment, taken along the axial direction.

As shown in FIG. 19, a present embodiment is an embodiment of the spark plug 1 that includes a protruding cylindrical body 53 that protrudes from a tip end of the plug cover 5 toward the pre-combustion chamber 50 side.

The protruding cylindrical body 53 has a substantially circular conical shape that decreases in diameter from the tip end side toward the base end side in the axial direction Z, and has an inner space passing therethrough in the axial direction Z. The inner space of the protruding cylindrical body 53 communicates with one of the injection holes 51.

Other configurations are similar to those according to the first embodiment.

According to the present embodiment as well, working effects similar to those according to the first embodiment are obtained.

The present disclosure is not limited to the above-described embodiments and can be applied to various embodiments without departing from the spirit of the invention.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A spark plug for an internal combustion engine, the spark plug comprising:
- a cylindrical insulator;
- a center electrode that is held on an inner circumferential side of the insulator and protrudes from the insulator toward a tip end side;
- a cylindrical housing that holds the insulator on an inner circumferential side;
- a ground electrode that forms a discharge gap between the ground electrode and the center electrode on the inner circumferential side of the housing; and
- a plug cover that is provided in a tip end portion of the housing so as to cover a pre-combustion chamber in which the discharge gap is arranged, wherein:

the plug cover is provided with an injection hole that communicates the pre-combustion chamber to the outside;

the ground electrode includes a discharge-side end portion that faces the discharge gap and a joining-side end portion that is joined to the housing;

the discharge-side end portion is arranged further toward a base end side in an axial direction than the joining-side end portion is;

the discharge-side end portion of the ground electrode is arranged so as to oppose the center electrode in a plug radial direction that is a direction along a straight line that is orthogonal to a plug center axis that is a center axis of the spark plug;

the ground electrode includes a relay portion that connects the joining-side end portion and the discharge-side end portion in the axial direction;

the joining-side end portion is joined to a tip end surface of the housing; and the relay portion is arranged along an inner circumferential surface of the housing.

2. The spark plug for an internal combustion engine according to claim 1, wherein:

the relay portion includes a protruding portion that protrudes toward the inner circumferential surface of the housing.

3. The spark plug for an internal combustion engine according to claim 2, wherein:

the plug cover is configured such that the injection hole is formed so as to form a swirl flow in the pre-combustion chamber, and an inner circumferential side surface of the relay portion is tilted toward a plug center axis side, from an upstream side toward a downstream side of the swirl flow.

4. The spark plug for an internal combustion engine according to claim 3, wherein:

the center electrode includes a flat discharge surface that has a flat planar shape on the discharge gap side.

5. The spark plug for an internal combustion engine according to claim 1, wherein:

the center electrode includes a flat discharge surface that has a flat planar shape on the discharge gap side.

6. The spark plug for an internal combustion engine according to claim 1, wherein:

the ground electrode includes a relay portion that connects the joining-side end portion and the discharge-side end portion;

the discharge-side end portion protrudes in the plug radial direction; and the joining-side end portion protrudes in the plug radial direction, toward a side opposite the discharge-side end portion.

7. The spark plug for an internal combustion engine according to claim 6, wherein the joining-side end portion protrudes in the plug radial direction, toward the side opposite the discharge-side end portion from a tip end portion of the relay portion.

8. A spark plug for an internal combustion engine, the spark plug comprising:

a cylindrical insulator;

a center electrode that is held on an inner circumferential side of the insulator and protrudes from the insulator toward a tip end side;

a cylindrical housing that holds the insulator on an inner circumferential side;

a ground electrode that forms a discharge gap between the ground electrode and the center electrode on the inner circumferential side of the housing; and a plug cover that is provided in a tip end portion of the housing so as to cover a pre-combustion chamber in which the discharge gap is arranged, wherein the plug cover is provided with an injection hole that communicates the pre-combustion chamber to the outside;

the ground electrode includes a discharge-side end portion that faces the discharge gap and a joining-side end portion that is joined to the housing;

the discharge-side end portion is arranged further toward a base end side in an axial direction than the joining-side end portion is;

the ground electrode includes a relay portion that connects the joining-side end portion and the discharge-side end portion in the axial direction;

the joining-side end portion is joined to a tip end surface of the housing; and the relay portion is arranged along an inner circumferential surface of the housing.

9. The spark plug for an internal combustion engine according to claim 8, wherein:

the relay portion includes a protruding portion that protrudes toward the inner circumferential surface of the housing.

10. The spark plug for an internal combustion engine according to claim 9, wherein:

the plug cover is configured such that the injection hole is formed so as to form a swirl flow in the pre-combustion chamber, and an inner circumferential side surface of the relay portion is tilted toward a plug center axis side, from an upstream side toward a downstream side of the swirl flow.

11. The spark plug for an internal combustion engine according to claim 10, wherein:

the center electrode includes a flat discharge surface that has a flat planar shape on the discharge gap side.

12. The spark plug for an internal combustion engine according to claim 8, wherein:

the plug cover is configured such that the injection hole is formed so as to form a swirl flow in the pre-combustion chamber, and an inner circumferential side surface of the relay portion is tilted toward a plug center axis side, from an upstream side toward a downstream side of the swirl flow.

13. The spark plug for an internal combustion engine according to claim 8, wherein:

the center electrode includes a flat discharge surface that has a flat planar shape on the discharge gap side.

14. A spark plug for an internal combustion engine, the spark plug comprising:

a cylindrical insulator;

a center electrode that is held on an inner circumferential side of the insulator and protrudes from the insulator toward a tip end side;

a cylindrical housing that holds the insulator on an inner circumferential side;

a ground electrode that forms a discharge gap between the ground electrode and the center electrode on the inner circumferential side of the housing; and a plug cover that is provided in a tip end portion of the housing so as to cover a pre-combustion chamber in which the discharge gap is arranged, wherein:

the plug cover is provided with an injection hole that communicates the pre-combustion chamber to the outside;

the ground electrode includes a discharge-side end portion that faces the discharge gap and a joining-side end portion that is joined to the housing;

the discharge-side end portion is arranged further toward a base end side in an axial direction than the joining-side end portion is;

the discharge-side end portion of the ground electrode is arranged so as to oppose the center electrode in a plug radial direction;

the ground electrode includes a relay portion that connects the joining-side end portion and the discharge-side end portion in the axial direction;

the joining-side end portion is joined to a tip end surface of the housing; and the relay portion is arranged along an inner circumferential surface of the housing.

15. The spark plug for an internal combustion engine according to claim 14, wherein:

the relay portion includes a protruding portion that protrudes toward the inner circumferential surface of the housing.

16. The spark plug for an internal combustion engine according to claim 15, wherein:

the plug cover is configured such that the injection hole is formed so as to form a swirl flow in the pre-combustion chamber, and an inner circumferential side surface of the relay portion is tilted toward a plug center axis side, from an upstream side toward a downstream side of the swirl flow.

17. The spark plug for an internal combustion engine according to claim 16, wherein:

the center electrode includes a flat discharge surface that has a flat planar shape on the discharge gap side.

* * * * *